United States Patent [19]

Barrus et al.

[11] Patent Number: 4,747,998
[45] Date of Patent: May 31, 1988

[54] THERMALLY ACTUATED THERMIONIC SWITCH

[75] Inventors: Donald M. Barrus; Charles D. Shires, both of San Jose, Calif.

[73] Assignee: The United States of America as represented by the United States Department of Energy, Washington, D.C.

[21] Appl. No.: 831,122

[22] Filed: Feb. 21, 1986

Related U.S. Application Data

[63] Continuation of Ser. No. 430,579, Sep. 30, 1982, abandoned.

[51] Int. Cl.⁴ .............................................. G21C 7/12
[52] U.S. Cl. ..................................... 376/336; 310/306; 313/310; 313/550; 361/103; 361/161; 376/321
[58] Field of Search ............... 376/321, 336, 337, 228, 376/230, 233; 310/306, 106; 313/310, 550; 361/103, 161; 322/2

[56] References Cited

U.S. PATENT DOCUMENTS

| | | | |
|---|---|---|---|
| 2,586,291 | 2/1952 | Bender | 313/310 |
| 2,885,893 | 5/1959 | Lane et al. | |
| 2,931,763 | 4/1960 | Dever | |
| 3,196,295 | 7/1965 | Oppen et al. | 313/310 |
| 3,257,848 | 6/1966 | Crosby, Jr. | 313/310 |
| 3,281,372 | 10/1966 | Haas | 310/306 |
| 3,330,974 | 7/1967 | Wilson | 376/321 |
| 3,437,910 | 4/1969 | Haring et al. | 322/2 |
| 3,493,792 | 2/1970 | Untermyer II | 313/550 |
| 3,519,949 | 7/1970 | Malnar et al. | 313/550 |
| 3,532,960 | 10/1970 | Webb | 310/306 |
| 3,791,298 | 2/1974 | Armand | |
| 3,793,542 | 2/1974 | Defranould et al. | 310/306 |
| 3,815,816 | 6/1974 | Scarelli | |
| 3,863,081 | 1/1975 | Jules et al. | 376/321 |
| 3,940,309 | 2/1976 | Imperiali | |

OTHER PUBLICATIONS

XL-895-00453, Germer et al, 9/80, pp. 1–23, (A-2)-(A-10).
"Study of Thermionic Converter Reactor Control Switch", G. E. Co., summary report, 6/6/80, Hatch et al, pp. 1–29.
KAPL-M-LBV-7, 9/55, Vandenberg, pp. 3–5, 9, 10, 20–28, 36–38.

*Primary Examiner*—Harvey E. Behrend
*Attorney, Agent, or Firm*—L. E. Carnahan; Roger S. Gaither; Judson R. Hightower

[57] ABSTRACT

A thermally actuated thermionic switch which responds to an increase of temperature by changing from a high impedance to a low impedance at a predictable temperature set point. The switch has a bistable operation mode switching only on temperature increases. The thermionic material may be a metal which is liquid at the desired operation temperature and held in matrix in a graphite block reservoir, and which changes state (ionizes, for example) so as to be electrically conductive at a desired temperature.

11 Claims, 2 Drawing Sheets

4,747,998

THERMALLY ACTUATED THERMIONIC SWITCH

BACKGROUND OF THE INVENTION

The invention described herein arose under Contract No. DE-AT03-76SF71032 between the U.S. Department of Energy and the General Electric Co.

This is a continuation of application Ser. No. 430,579 filed Sept. 30, 1982, now abandoned.

The invention relates to temperature activated switches, particularly to thermionic switches, and more particularly to a thermally actuated thermionic switch.

Temperature responsive switches which involve a change of state condition or expansion of an operative material when temperature is applied thereto are well known in the art. These prior switches are exemplified by U.S. Pat. Nos. 3,791,298 issued Feb. 12, 1974 to P. Amberny, and 3,815,816 issued June 11, 1974 to D. Scarelli.

Thermionic devices have been in use for many years as lights, vacuum tubes, power converters, and as electrically driven switches. These prior thermionic devices use control grids, temperature difference between the emitter and collector, or voltage changes to cause their actions.

More recently, thermionic devices have been utilized in nuclear reactor control systems, particularly in self-actuated control systems responsive to low-flow, high temperature, or over-power conditions of the reactor. In such control systems, the control rods are rapidly inserted into the reactor core for quick shut down of the reactor. Such self-actuated reactor control systems are, for example, described and claimed in copending U.S. Patent Application Ser. Nos. 270,672 and 270,682, each filed June 4, 1981 in the name of D. M. Barrus et al, and assigned to the assignee of this application.

While various thermionic switches have been developed, a need has existed for a simple, yet effective thermionic switch responsive to temperature particularly in the field of reactor control systems. Such an improved switch would find use in numerous applications for temperature control and limiting functions, aside from their use in reactor systems.

SUMMARY OF THE INVENTION

The instant invention satisfies the above-mentioned need by providing a simply constructed, yet effective thermally actuated thermionic switch. The thermally actuated thermionic switch of this invention is a diode differing from those mentioned above in that it operates in an isothermal condition (not depending on temperature differences between the electrodes as in a power converter), nor does it use a control grid as in a vacuum tube.

Therefore, it is an object of this invention to provide a thermionic switch.

A further object of the invention is to provide a thermally actuated thermionic switch.

Another object of the invention is to provide a thermionic switch which responds electrically to an increase in temperature by changing from a high impedance to a low impedance at a predictable temperature set point.

Another object of this invention is to provide a thermally actuated thermionic switch which is particularly suitable for use in nuclear reactor control systems.

Another object of the invention is to provide a thermally actuated thermionic switch which can be utilized for temperature control and limiting functions.

Other objects of the invention will become readily apparent to those skilled in the art from the following description and accompanying drawings.

The above objects are accomplished by a thermally actuated thermionic switch which operates in an isothermal condition, and is responsive to temperatures above a pre-set minimum. The thermionic switch of this invention responds to an increase of temperature by changing from a high impedance to a low impedance. Such thermionic switches are particularly useful in reactor control or shutdown systems, wherein the switch is responsive to the temperature of the coolant flowing through the reactor core.

More specifically, the thermally actuated thermionic switch of this invention comprises two electrodes, an emitter and a collector, which are separated mechanically and electrically isolated from one another, and provided with a quantity of thermionic material in matrix in a graphite block reservoir, and an electrical circuit connected to said electrodes, such that heating of said thermionic material causes the switch to trigger for activating a desired mechanism, such as an associated electromagnetic apparatus of a reactor control system.

DETAILED DESCRIPTION OF THE INVENTION

The present invention is directed to a thermally actuated thermionic switch which responds to an increase of temperature by changing from a high impedance to a low impedance at a predictable temperature set point.

While the thermally actuated thermionic switch is illustrated and described herein for an application in a nuclear reactor self-actuating shutdown system and responsive to the temperature of the reactor coolant, it is not intended to limit the invention to this application. Also, it is not intended to limit the use of the thermionic switch to the specifically illustrated shutdown system as it can be utilized in other types of shutdown or control systems. The thermionic switch of this invention has numerous applications for temperature control and limiting functions.

Figure 1:
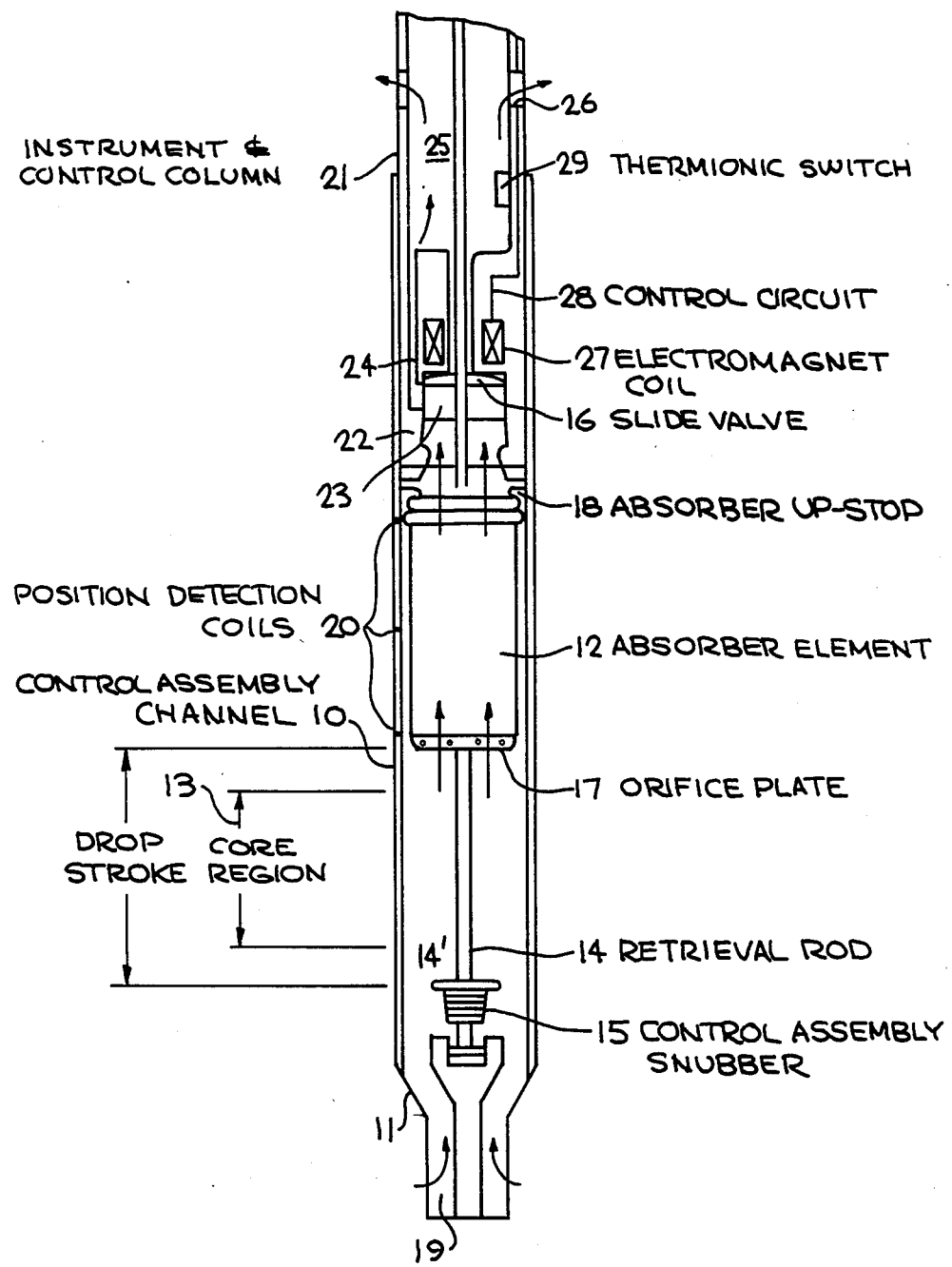
FIG. 1 illustrates a general arrangement of a self-actuated shutdown system for a nuclear reactor utilizing the thermionic switch of the present invention.

Referring now to FIG. 1 a self-actuating shutdown system (SASS) incorporating the present invention is illustrated. While not shown, it is known in the art that control rods or elements of the SASS are positioned within a fuel bundle containing a plurality of fuel rods. The fuel bundles are located in the core of the reactor, while the control rod or neutron absorber element of that bundle is maintained above the core during normal reactor operation. As shown in FIG. 1, the SASS comprises a control assembly channel or casing 10 secured at the lower end to an inlet nozzle 11 and provided with an absorber element 12 composed of neutron absorbing material, as known in the art, and mechanism for controlling the location of the element 12 with respect to a reactor core region indicated at 13. A retriever rod 14 is positioned in casing 10 and extends through element 12 and longitudinallly through the casing. The lower end of rod 14 is provided with a ring or member 14' which serves to raise element 12 to its ready position, and cooperates with a control assembly snubber, or dashpot 15, or other kinetic energy absorbing means to slow the descent of the absorber element 12 after it enters the core region 13 and to return the element 12 to its ready position. The upper end of retriever rod 14 is adapted to be connected to drive grapple or mechanism (not shown) supported on the reactor top shield to perform upward movement of the absorber element and to reposition a magnetically retained slide valve 16, as described hereinafter.

The absorber element 12 is provided at the lower end with plate 17 having a plurality of orifices to control cooling flow therethrough. As shown, the element 12 is in its ready or cocked position above the core region 13 and is retained hydrostatically against an absorber up-stop or face seal 18 fixedly secured to casing 10. Element 12 is held against up-stop 18 by the pressure differential across element 12 created by coolant flowing upwardly under pressure through inlet 19 in nozzle assembly 11 from a pressure plenum (not shown), as indicated by the flow arrows.

The pressure differential which retains the absorber element 12 against up-stop or face seal 18 is produced, as known in the art, by the different in surface area at the top and bottom of the elements 12 on which the pressurized coolant may act. Since the surface area at the lower end of the element 12 is greater than that at the upper end thereof, due to the element abutting against up-stop 18, the element 12 is hydrostatically retained in its up or cocked position. Any decrease in pressure differential below the minimum required to support the weight of element 12 will cause the element to fall towards core region 13. As soon as the element is separated from the face seal or up-stop 18, essentially all the pressure differential is lost, since the coolant can act against the entire upper surface of the element causing the pressure above and below the element to equalize, and the element will fall freely into the core region 13 under the influence of gravity, the drop stroke of element 12 being illustrated by legend. The fall of the absorber element 12 will be retarded only by flow resistance of the displaced fluid with casing 10, and near the bottom of its stroke or fall by the snubber or dashpot assembly 15 for absorbing the kinetic energy.

The pressure differential holding the element 12 in its upper position is a function of the total core pressure drop and the relative flow resistances of any active cooling passages in the absorber element and of the inlet orifice. Since pressure drop across the core region 13 varies with the square of the flow, the available pressure will decrease rapidly as flow decreases.

A valve (not shown) for by-passing the face seal or up-stop 18 can be utilized to provide a control element scram as a result of excessive core outlet temperature. Such a valve is normally closed, and is designed to open on an over-temperature signal. It can be actuated, for example, by melting a fusible material, a thermionic diode without fissionable material, by an electromagnetic device, as known in the art, or by a thermally actuated thermionic switch of the present invention.

A mechanical drive or grapple, not shown, is connected to the upper end of retriver rod 14, as set forth above, for raising the absorber element 12 and holding it in its upper position until adequate coolant flow is established to produce the pressure differential discussed above. The grapple must be released before reactor operation. Release of the grapple can be assured after disconnecting by raising the grapple to a higher position.

To enable the plant operator to know the location of the absorber element 12 with respect to the core region 13, a plurality of position detection coils 20 (three in this embodiment) are positioned on the casing 10 along the length of the element 12. It is readily seen that the location of element 12 can be determined by the readout from the coils 20. Should the element 12 be in a partially inserted (lower position), for example, the readout from the upper coil 20 would differ from that of the two lower coils. Coil readout apparatus is well known in the art and further description of such is deemed unnecessary.

Positioned above the up-stop 18 is an instrument and control column 21, including a housing 22 which, at the lower end thereof, is secured in casing 10 and provided with seal means for preventing coolant flow therebetween. Housing 22 includes a chamber 23 within which slide valve 16 is movably positioned. A fluid or coolant passage 24 extends from chamber 23 to an outlet chamber 25 in control column 21, which is provided with coolant flow outlet openings 26. An electromagnetic coil 27 is positioned above slide valve 16 and is connected via an electromagnetic control circuit indicated at 28 to a power supply (see FIG. 2). A thermally actuated thermionic switch 29 mounted in chamber 25 and secured to control column 21 is electrically connected in control circuit 28 so as to be in parallel with coil 27 and is responsive to coolant temperature. The electromagnetic coil 27 is normally energized from above the reactor head via control circuit 28 such that slide valve 16 is magnetically retained in its upper position, as shown, whereby coolant flows through passage 24 into chamber 25 and out openings 26, as indicated by the flow arrows. In the event of an excessive temperature of the reactor coolant, the thermionic switch 29 is heated to a change of state condition. This change of state causes the switch 29 to trigger or activate, causing the electromagnetic coil 27 to be short-circuited and lose its holding power, whereupon the slide valve 16 drops by gravitational force and closes off the flow through passage 24. This change (decrease) in coolant flow above absorber element 12 causes a decrease in the differential pressure across element 12 such that the holding pressure is less than the weight of the element, whereby element 12 moves downwardly with respect to face seal or up-stop 18. As described above, this initial downward movement or drop of absorber element 12 results in a loss of pressure differential or equalization of the coolant pressure above and below the element such that the element drops into reactor core region 13 under full gravitational force.

When normal reactor flow conditions and coolant temperature have been reestablished, or there has been a sufficient reduction of the coolant temperatures, the absorber element is returned to its ready or cocked position by means of the retrieval rod 14, as described above. In addition, the retrieval process returns the slide valve 16 to its position against the electromagnet and is retained in the upper section of chamber 23 by magnetic attraction when the electromagnetic coil 27 is re-energized. The retrieval rod 14 is then lowered to permit the full drop stroke of the absorber element 12. The retrieval rod 14 is provided with a member, not shown, such as a ring, which is located on rod 14 so as to simultaneously position slide valve 16 at the top of chamber 23 adjacent electromagnetic coil 27 and element 12 against up-stop 18.

The thermally actuated thermionic switch 29 operates with a fixed applied DC voltage standing off electrical currents allowing only a very small idle current to pass (high impedence) until the temperature of the switch is raised to a point where the thermionic material ionizes allowing the conduction of large electrical currents (low impedance). Once this switching (ignition) takes place, the switch remains stable and ignited through a large range of voltage and temperature changes.

Resetting of the switch 29 requires reduction of the temperature below the set point and the cutting of the applied voltage. The switch has a bistable operation mode switching only to temperature increases.

The switching point is a function of the temperature and the pressure of the thermionic material in the interelectrode gap of the switch; therefore, either the emitter or the reservoir can be designed to be the thermally responding element of the switch.

Figure 2:
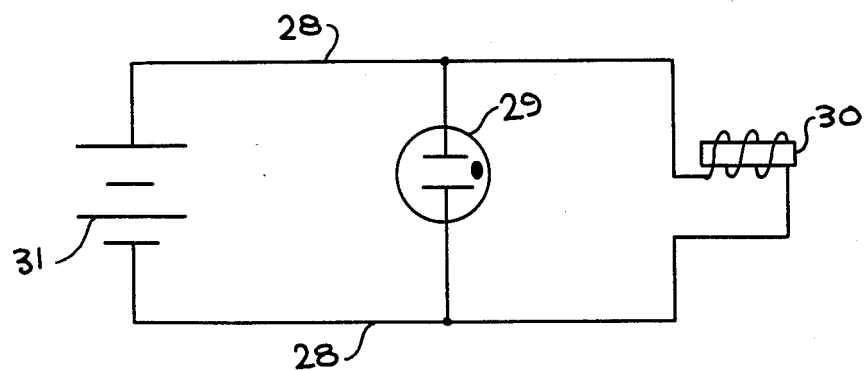
FIG. 2 schematically illustrates an embodiment of an electric circuit interconnecting the thermionic switch of the invention for activating the electromagnet of the FIG. 1 system.

FIG. 2 shows a simple electrical schematic of the thermally actuated thermionic switch 29 of this invention and its use to control a relay 30 of the electromagnet 27 by diverting the current from a D.C. power supply, such as battery 31, via control circuit 28 of the FIG. 1 apparatus. Typical control action in the circuit 28 is as follows: The current is furnished to the relay 30 by the battery 31, the relay remains in the latched or control rod holding position while the temperature of the thermionic switch 29 is below the set point, the set point temperature being in the range of 565° to 570° C. When the temperature of the switch 29 rises above the set point, due to an increase in reactor coolant temperatures, the thermionic material in switch 29 ionizes changing the impedance of the switch, from a high impedance to a low impedance, thereby conducting a large current through the switch, which in effect, short-circuits the current to the relay 30 causing it to open, whereby electromagnet 27 is de-energized, initiating action of slide valve 16 and allowing the control rod or absorber element 12 to drop into core region 13.

By way of example, the power supply or battery has a voltage of 10 volts, a current of 20 milliamps normally flows through circuit 28 to maintain the relay 30 in its closed position, with the impedance of switch 29 being about 500 ohms at a coolant temperature of below about 565° C. When the thermionic material of switch 29 inonizes, at a coolant temperature of about 590° C., the impedance of switch 29 drops to about 1.0 ohms, and the current which then passes through the switch is about 10 amps.

Figure 3:
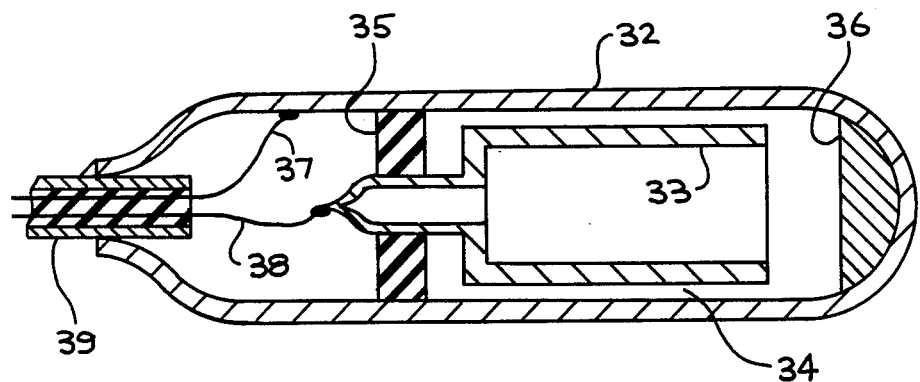
FIG. 3 is a cross-sectional view of an embodiment of a thermally actuated thermionic switch made in accordance with the invention.

Referring now to FIG. 3, a specific embodiment of the thermally actuated thermionic switch of the present invention is illustrated. As pointed out above the thermionic switch of this invention a diode differeing from those mentioned above in that it operates in an isothermal condition, not depending on temperature differences between the electrodes, nor does it use a control grid.

The thermionic switch 29 of FIG. 3 basically consists of two electrodes, an emitter 32 and a collector 33 having a tubular shaped section, which are separated mechanically by a gap 34 and electrically isolated from one another by a sealing insulator 35, and a quantity of thermionic material 36. As shown, the emitter 32 constitutes an outer body or casing for the other components of the switch 29, with emitter 32 and collector 33 being connected to leads 37 and 38, respectively, which are electrically connected to circuit 28 as shown in FIG. 2. Leads 37 and 38 extend through a tube or conduit 39 of insulative material secured in one end of emitter 32.

The thermionic material 36, in this embodiment, is a metal which is liquid at the desired operation temperature, and is held in a matrix in a graphite block reservoir secured to an end of emitter 32 opposite conduit 39. The metal-graphite reservoir of this type allows the switch 29 to be mounted in any position, and it also provides a method of controlling the vapor pressure of the thermionic material to adjust the desired set point. Other reservoirs can be devised using solids which sublimate, or other liquids or gases. A typical material used for the embodiment shown is a cesium loaded graphite block (lamellar compound) fastened to the outer body or casing (emitter 32) of the switch. However, other thermionic materials such as sodium, potassium, and rubidium can be used in place of cesium in a graphite block. The emitter or outer body 32 of the switch 29 is in contact with the medium to be measured, the reactor coolant in the FIG. 1 arrangement, and thus the switch 29 is responsive to an increase in temperature above a desired set point, as described above.

By way of example, the emitter 32 is constructed of molybdenum, the collector 33 constructed of molybdenum or stainless steel, the sealing insulator 35 constructed of alumina, the thermionic material 36 being a cesium loaded graphite block, and the insulative tube or conduit being made of alumina.

While the thermionic switch 29 is shown in the FIG. 1 apparatus as mounted on the interior of the instrument and control column, it can be located on the exterior of the column, for example, such that it is responsive to reactor coolant flowing upwardly through fuel assemblies which are located about the control rod apparatus or SASS, as known in the art.

It has thus been shown that the present invention provides a simple, yet effective means responsive to temperature for activating an electrically actuated component, such as an electromagnetic arrangement for dropping a control rod into a reactor core, when the temperature exceeds a desired set point.

While a particular embodiment of the thermionic switch of the invention and a specific application for the switch has been described and illustrated, modifications of the switch and other applications therefore will become apparent to those skilled in the art, and it is intended to cover in the appended claims all such modifications as come within the scope of the invention.

What is claimed is:

1. A thermally actuated thermionic switch which responds electrically to an increase in temperature of thermionic material therein by changing from a high impedance to a low impedance at a predetermined temperature set point, comprising:

an emitter constituting an outer casing of said switch and adapted to be in contact with an associated medium which may undergo a change in temperature, said outer casing having a closed end and an open end, a collector positioned totally within said emitter and separated therefrom by a gap, said collector including a hollow longitudinally extending annular section and a hollow reduced diameter section, said collector being electrically isolated from said emitter and retained within said emitter by an insulator member positioned within said emitter, said insulator member being located intermediate said reduced diameter section of said collector and an inner surface of said emitter, means for closing said open end of said outer casing formed by said emitter for defining a closed volume within said emitter, electrical lead means connected to said inner surface of said emitter and to said reduced diameter section of said collector and extending through said means for closing said outer casing for connection to an associated power supply and to an associated point of use, and a quantity of thermionic material held in a matrix in a graphite block reservoir, and which is located within said emitter, said thermionic material consisting of metal which ionizes when heated to a temperature above said set point, for electrically connecting said emitter and collector when said thermionic material is ionized, whereby upon said thermionic material ionizing, said switch changes from high impedance to low impedance allowing the conduction of large electrical currents therethrough.

2. The thermionic switch of claim 1, wherein said thermionic material is a metal which is liquid at a desired operation temperature.

3. The thermionic switch of claim 1, wherein said metal is selected from the group consisting of cesium, sodium potassium and rubidium.

4. The thermionic switch of claim 1, wherein said set point is in a range of about 565°–570° C., and wherein said thermionic material consists of a cesium loaded graphite block secured to an inner surface of said emitter.

5. The thermionic switch of claim 1, wherein said means for closing said outer casing comprises a member containing insulative material secured in and extending into said emitter, through which said electrical lead means extend.

6. A thermionic switch which responds electrically upon an increase in temperature, which ionizes thermionic material therein, by changing from a high impedance to a low impedance at a predetermined temperature set point and adapted to be responsive to coolant temperature:

said thermionic switch containing a quantity of thermionic material which ionizes when heated to a predetermined temperature above said set point, said thermionic material constituting a metal held in a matrix in a graphite block reservoir, said switch additionally including:

an emitter electrode defining an outer body of said switch and adapted to be in contact with an associated coolant, said outer body having a closed end and an open end, said graphite block reservoir being secured to an inner surface of said emitter electrode.

a collector electrode located totally within and spaced from said emitter electrode, said collector electrode including a hollow longitudinally extending annular section and a hollow reduced diameter end section, an insulator member secured to an inner surface of said emitter electrode and secured to an outer surface of said collector electrode for retaining said collector electrode within said emitter electrode and for electrically isolating same, means containing insulative material for closing said open end of said emitter electrode for forming a closed volume therein, and electrical lead means connected to said inner surface of said emitter electrode and to said collector electrode and extending through said closing means and adapted to be connected to an associated electrical circuit for controlling same, said quantity of thermionic material being located within said emitter electrode for electrically connecting said emitter electrode and collector electrode when said material is ionized so as to change said switch from high impedance to low impedance allowing the conduction of electrical current therethrough.

7. The improvement of claim 6, wherein said temperature set point is in the range of about 565°–570° C., and wherein said quantity of thermionic material consists of a cesium loaded graphite block.

8. The improvement of claim 6 wherein said metal is cesium, and wherein said temperature set point is in a range of about 565°–570° C.

9. A thermally actuated thermionic switch which changes from a high impedance to a low impedance upon ionization of thermionic material therein at a predetermined temperature such that large electrical currents are allowed to flow therethrough, comprising:

an emitter electrode constructed to define an outer casing having an open end and a closed end and constructed to form a space therein, means comprising an insulator member for closing said open end of said emitter electrode for defining a closed volume, a collector electrode located totally within said space and spaced from said emitter electrode so as to form a gap therebetween, said collector electrode including a hollow longitudinally extending annular section and a hollow reduced diameter section, insulator means positioned totally within said space formed by said emitter electrode for retaining said collector electrode within said emitter electrode and for electrically isolating said collector electrode from said emitter electrode, said insulator means being positioned intermediate an outer surface of said collector electrode and an inner surface of said emitter electrode, electric lead means connected to said inner surface of said emitter electrode and to said reduced diameter section of said collector electrode, extending through said closing means, and adapted to be connected to an associated power supply and to an associated point of use, and a quantity of thermionic material selected from the group consisting of cesium, sodium, potassium and rubidium, which ionizes upon being heated to a predetermined temperature, located within said emitter electrode and held in a matrix in a graphite block reservoir so as to be adjacent said emitter electrode for electrically connecting said emitter electrode and said collector electrode when said material ionizes, such that large electrical currents are allowed to pass through said switch from an associated power supply to an associated point of use due to said switch changing from a high impedance to a low impedance at a predetermined temperature.

10. The thermionic switch of claim 9, wherein said emitter electrode is constructed to include a longitudinally extending annular section, a closed end section and an open end section, said collector electrode and said insulator means being located within said longitudinally extending annular section of said emitter electrode, said thermionic material being located in said closed end section of said emitter electrode and said insulator member through which said electrical lead means extend being located in said open end section of said emitter electrode.

11. The thermionic switch of claim 6, wherein said quantity of thermionic material is selected from the group consisting of cesium, sodium, potassium and rubidium.

* * * * *